United States Patent
Niiyama et al.

(10) Patent No.: US 7,312,967 B2
(45) Date of Patent: Dec. 25, 2007

(54) ELECTRONIC APPARATUS

(75) Inventors: Kenichi Niiyama, Kyoto (JP); Seiichi Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 428 days.

(21) Appl. No.: 10/761,743

(22) Filed: Jan. 21, 2004

(65) Prior Publication Data
US 2004/0150930 A1 Aug. 5, 2004

(30) Foreign Application Priority Data
Jan. 21, 2003 (JP) .............................. 2003-011791

(51) Int. Cl.
*H02H 9/04* (2006.01)
(52) U.S. Cl. ................................... 361/91.1
(58) Field of Classification Search ............... 361/91.1, 361/56
See application file for complete search history.

(56) References Cited

U.S. PATENT DOCUMENTS

| | | | | |
|---|---|---|---|---|
| 3,991,381 A | * | 11/1976 | Sechi ........................ 330/277 |
| 4,683,443 A | * | 7/1987 | Young et al. ................ 330/277 |
| 5,091,818 A | * | 2/1992 | Morikawa et al. ............ 361/56 |
| 5,438,213 A | * | 8/1995 | Tailliet ....................... 257/360 |
| 5,451,814 A | * | 9/1995 | Yoshimizu .................. 257/685 |
| 5,508,548 A | * | 4/1996 | Tailliet ....................... 257/360 |
| 5,568,345 A | * | 10/1996 | Mudd et al. .................. 361/56 |
| 6,560,081 B1 | * | 5/2003 | Vashchenko et al. ......... 361/56 |
| 6,762,461 B2 | * | 7/2004 | Kawamoto .................. 257/358 |
| 2003/0076639 A1 | * | 4/2003 | Chen ........................... 361/56 |

FOREIGN PATENT DOCUMENTS

| | | |
|---|---|---|
| JP | 61-154423 | 7/1986 |
| JP | 6-244697 | 9/1994 |
| JP | 11-41801 | 2/1999 |

\* cited by examiner

*Primary Examiner*—Michael Sherry
*Assistant Examiner*—Boris Benenson
(74) *Attorney, Agent, or Firm*—Hamre, Schumann, Mueller & Larson, P.C.

(57) ABSTRACT

By voltage limiting means, which provided in an IC as one of the components of an electronic apparatus, and a resistor, which is provided between a voltage input terminal of the IC and an external terminal of the electronic apparatus, an unexpected abnormal voltage generated in a DC power source such as an AC adaptor can be limited, and an overvoltage of not less than a predetermined value can be also prevented from being applied to the IC.

1 Claim, 4 Drawing Sheets

ELECTRONIC APPARATUS

BACKGROUND OF THE INVENTION

1. Field of the Invention

The present invention relates to an electronic apparatus for protecting a built-in semiconductor integrated circuit (IC) chip from an unexpected abnormal voltage applied from a DC power source such as an AC adapter.

2. Description of the Related Art

Conventionally, a power voltage to be applied to an IC chip is transformed and rectified from a commercial AC power source by an AC adaptor to form and supply a predetermined DC voltage. A voltage output from the AC adaptor is usually supplied stably. In the case in which an AC adaptor having a low performance is used or the case in which the AC adaptor is brought into a defective state, the generation of an unexpected overvoltage cannot be avoided. The overvoltage is supplied to the IC connected to the AC adaptor so that a circuit unit in the IC might be broken.

In order to avoid such a situation, conventionally as shown in FIG. 5, the voltage of an AC power source 1 is transformed and rectified by an AC adaptor 2 to form a predetermined adaptor output voltage Vad, then the adaptor output voltage Vad is stabilized by a regulator 3 having a high breakdown voltage, and said stabilized DC voltage is supplied to an IC 4.

On the other hand, an overvoltage limiting circuit comprising a resistor and an overvoltage limiting device (for example, a Zener diode) is connected to an input terminal in the IC into which a power is supplied from a three-terminal regulator so that the voltage limited by an overvoltage limiting device is obtained. There has been proposed an IC for supplying such a limited voltage to an internal circuit as disclosed OPI patent JP Hei 11-41801.

Concerning such a conventional type regulator in which the high breakdown voltage regulator needs to be provided between an AC adaptor and an IC, the production cost might be increased due to said high breakdown voltage regulator being separately required.

In case of using an overvoltage limiting circuit described in JP Hei 11-41801, a resistor constituting the overvoltage limiting circuit needs to be provided in the IC in addition to the overvoltage limiting device. Therefore, it is required for the IC process design to be carried out on the basis of an input overvoltage. Accordingly, due to such a restriction being placed on the design process, there might be a limitation of the overvoltage which the IC can cope with. Moreover, the resistor constituting the overvoltage limiting circuit is required to limit a current flowing into the overvoltage limiting device in a value within a predetermined range thereof. Furthermore, also required is to control generated heat, being generated in the resistor with depending on a current flowing in an internal circuit (or its unit block) to which a limited voltage is supplied, within a predetermined range. In order to satisfy these requirements, the degree of design freedom of the overvoltage limiting circuit is inevitably restricted.

SUMMARY OF THE INVENTION

Therefore, it is an object of the invention to provide an electronic apparatus to limit an abnormal voltage applied from a DC power source, which might generate an unexpected abnormal voltage, with providing a simple external device on the outside of an IC without having a high breakdown voltage regulator in it. Having such a structure, the overvoltage resistance amount of the IC can be reduced, on top of this, the process design, including that of the overvoltage limiting circuit, can be easily carried out.

A first aspect of the invention is directed to an electronic apparatus comprising a first IC including a first voltage input terminal, a voltage limiting means connected electrically to the first voltage input terminal and serving to limit a voltage to be applied to the first voltage input terminal to have a predetermined value, and a first circuit block to which the voltage limited by the voltage limiting means is supplied, an external power terminal to which a DC power voltage is applied from an outside, and a resistor connected electrically between the external power terminal and the first voltage input terminal, wherein the resistor and the voltage limiting means limit an input voltage to be applied to the first voltage input terminal to have the predetermined value when the DC power voltage to be applied to the external power terminal becomes an overvoltage.

A second aspect of the invention is directed to the electronic apparatus according to the first aspect of the invention, further comprising at least one second IC including a second voltage input terminal to which the input voltage is applied, and a second circuit block to which the input voltage applied to the second voltage input terminal is supplied.

DESCRIPTION OF THE PREFERRED EMBODIMENTS

Figure 1:
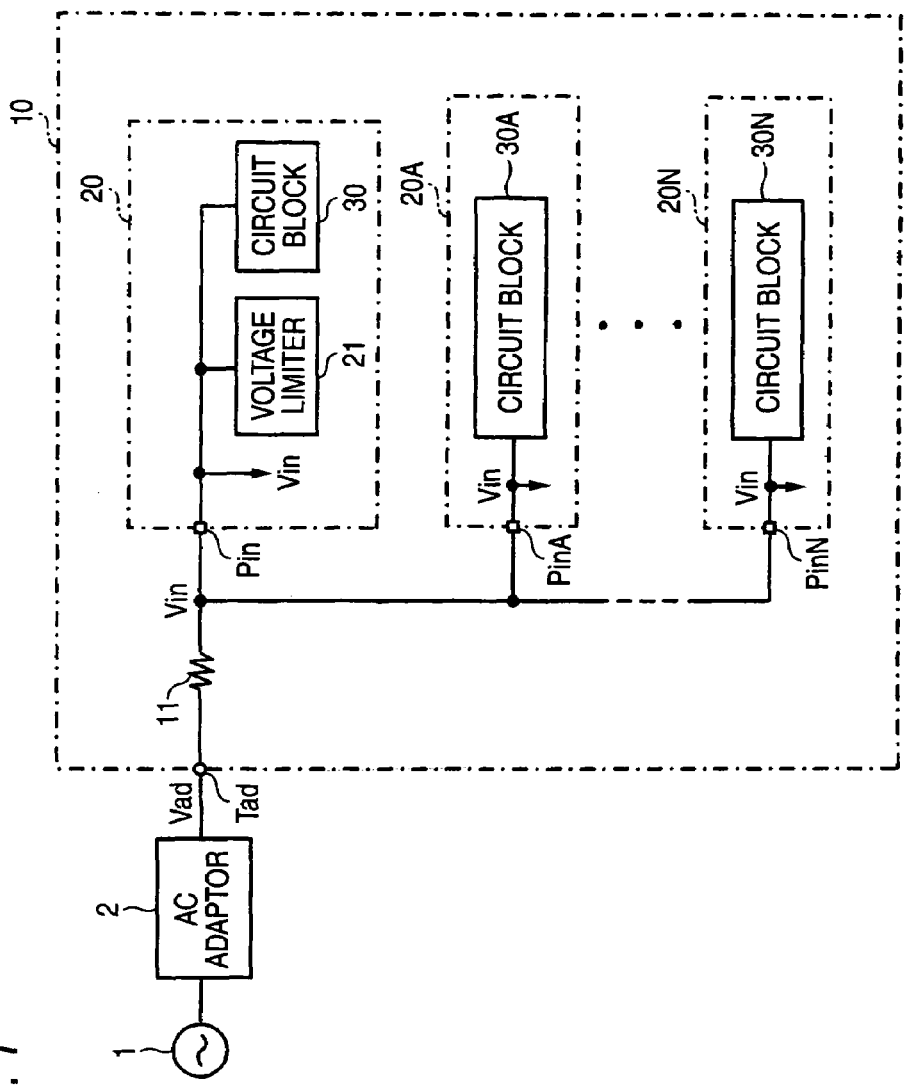
FIG. 1 is a diagram showing a circuit structure according to a first embodiment of the invention.
Figure 2:
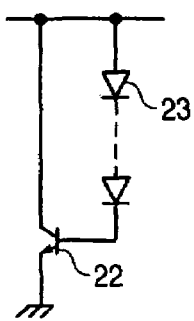
FIGS. 2(a) to 2(c) show the diagrams showing the examples of the structure of a voltage limiter.
Figure 2:
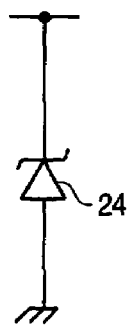
Figure 2:
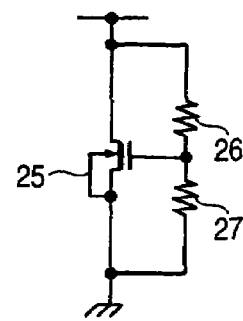
Figure 3:
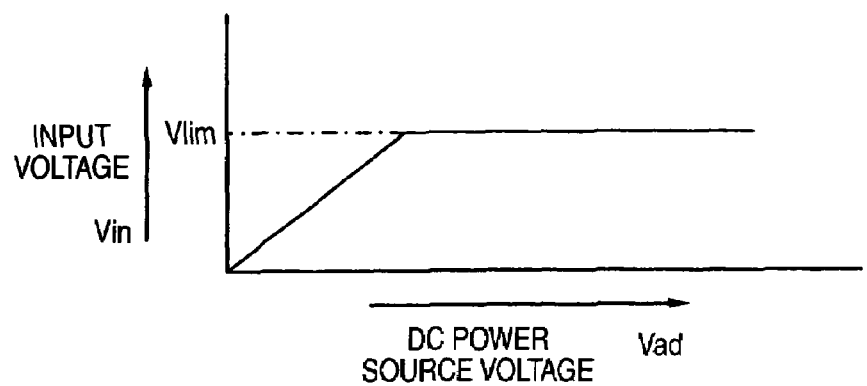
FIG. 3 is a chart showing the voltage limitation characteristic of the voltage limiter.

Embodiments of an electronic apparatus according to the invention will be described below with reference to the drawings. FIG. 1 is a diagram showing a circuit structure according to a first embodiment of the invention, FIG. 2 is a diagram showing an example of the structure of a voltage limiting means (hereinafter referred to as a voltage limiter), and FIG. 3 is a chart showing a voltage limitation characteristic.

In FIG. 1, the AC voltage of a commercial AC power source 1 is supplied to an AC adaptor 2 and is transformed, rectified and smoothened by the AC adaptor 2, thereby forming a predetermined DC power voltage Vad. The DC power voltage Vad is applied to an external power terminal Tad of an electronic apparatus 10. In general, the DC power voltage Vad is supplied in a stable condition. In some cases, however, in such cases of using an AC adaptor with a low performance or bringing the AC adaptor into a defective state, an unexpected overvoltage might be generated.

The electronic apparatus 10 is provided with the first IC 20 and a plurality of the second ICs 20A to 20N. Voltage input terminals Pin, and PinA to pinN of these ICs are formed by a pad, for example, which are connected in common at outside of the ICs. A resistor 11 is connected between the common node and the external power terminal Tad.

In the first IC 20, a voltage limiter 21 and a circuit block 30 are provided in a manner such as to be connected to the voltage input terminal Pin. As for the second ICs 20A to 20N, the circuit blocks 30A to 30N are provided such as to be connected to their corresponding voltage input terminals PinA to PinN. The number of the second ICs 20A to 20N might be optional, therefore one or none can be also considered according to the circuit design conditions.

In case of an overvoltage occurrence, The voltage limiter 21 serves to limit the voltage of the voltage input terminal Pin to have a predetermined value in cooperation with the resistor 11 and employs circuit structures such as shown in FIGS. 2(*a*), 2(*b*) and 2(*c*). Having had the voltage limiters 21 in FIGS. 2(*a*) to 2(*c*), an input voltage Vin in a voltage limitation is eventually limited to have a predetermined limited voltage value Vlim. A difference voltage between the DC power voltage Vad and the limited voltage value Vlim, which is obtained by limiting the input voltage Vin, is applied to both ends of the resistor 11.

The voltage limiter 21 in FIG. 2(*a*) is constituted by an NPN transistor (hereinafter referred to as an NPN) 22 connected between the input voltage Vin of the voltage input terminal Pin and a ground, and at least one diode 23 connected in series between the base terminal of the NPN 22 and an input voltage point. When the number of the diodes 23 connected in series is represented by N and a voltage drop per diode 23 is represented by Vf, the NPN 22 is conducted to be ON-state if the input voltage Vin becomes more than a predetermined voltage "(N+1)×Vf". Consequently, the input voltage Vin is limited to the predetermined voltage "(N+1)×Vf".

In the voltage limiter 21 in FIG. 2(*b*), a Zener diode 24 is connected between the input voltage Vin of the voltage input terminal Pin and the ground. The input voltage Vin is limited to a Zener voltage Vz of the Zener diode 24.

The voltage limiter 21 in FIG. 2(*c*) is constituted by an N-type MOS transistor (hereinafter referred to as an NMOS) 25 which is connected between the input voltage Vin of the voltage input terminal Pin and the ground, a resistor 26 (a resistance value of R1) which is connected between the gate terminal of the NMOS 25 and an input voltage point, and a resistor 27 (a resistance value of R2) which is connected between the gate and the ground. If a gate voltage "Vin× R2/(R1+R2)" determined by a voltage dividing ratio of the resistors 26 and 27 becomes more than a threshold voltage Vth of the NMOS 25, the NMOS 25 is conducted to be ON-state. Therefore, the input voltage Vin is limited to a predetermined voltage "Vth×((R1+R2)/R2)".

In the case in which the DC power voltage Vad is supplied with an expected voltage value from the AC adaptor 2 in the electronic apparatus 10 as shown in FIG. 1, the voltage limiter 21 of the IC 20 is not operated so that the input voltage Vin to be applied to the voltage input terminal Pin is supplied to the circuit block 30. Even in such a stable condition, a voltage drop might be generated by a current flowing into the circuit block 30 and a resistance value R11 of the resistor 11 in the resistor 11 so that this resistance loss causes heat generation. By setting the resistance value and the current value such as to place the voltage drop to be within a predetermined range, the input voltage Vin can be maintained in a certain value without bothering the operation of the circuit block 30.

The DC power voltage Vad is changed into an unexpected overvoltage because the AC adaptor is brought into the defective state. When the input voltage Vin is more than the limited voltage value Vlim of the voltage limiter 21, the voltage limiter 21 is operated so that the input voltage Vin is limited to have the limited voltage value Vlim. FIG. 3 shows a voltage limitation characteristic indicative of the relationship between the DC power voltage Vad and the input voltage Vin.

In the overvoltage limiting operation state, a difference voltage (Vad−Vlim) between the DC power voltage Vad and the limited voltage value Vlim is applied between both ends of the resistor 11 and a voltage limiting current Ilim corresponding to the difference voltage flows into the resistor 11. Accordingly, a loss of the current Ilim by the resistance value R11 is generated in the resistor 11 so that heat is generated. However, the resistor 11 constituting the overvoltage limiting circuit together with the voltage limiter 21 is provided on the outside of the IC 20. Therefore, not only an overvoltage being not applied to the IC 20, but also the IC 20 can be prevented from being influenced by the heat generation due to the overvoltage limiting current Ilim.

Thus, an unexpected abnormal voltage generated in the AC adaptor 2 can be limited by the voltage limiter 21, which is provided in the IC 20, and the resistor 11 which is provided between the voltage input terminal Pin of the IC 20 and an external power terminal Pad. Therefore, a voltage of not less than the predetermined value Vlim might not be applied to the IC 20. Furthermore, since the resistor 11 constituting the overvoltage limiting circuit is provided on the outside of the IC 20, it is possible to satisfy the requirements such that the current Ilim flowing into the voltage limiter 21 can be regulated to have a certain value within a predetermined range in case of the overvoltage limitation, and the heat generated in the resistor 11 can be also regulated within a predetermined range. Accordingly, the overvoltage resistance amount of the IC 20 can be reduced and a process design including that of the voltage limiter 21 can be carried out rather freely.

In the case of the electronic apparatus 10 being provided with the IC 20 having the voltage limiter 21 as well as with other ICs 20A to 20N, in this invention, the resistor 11 constituting the overvoltage limiting circuit is provided on the outside of the IC 20. Therefore, it is not necessary for said other ICs 20A to 20N to be provided with such a voltage limiter, because the limited input voltage Vin can be supplied to each of the voltage input terminals PinA to PinN. In other words, the remaining ICs 20A to 20N can be protected from an overvoltage without taking any countermeasure for an overvoltage protection.

The first embodiment shown in FIG. 1 has been described on the assumption that the voltage limiter 21 is provided in only one IC 20. However, the same type of the voltage limiter might be provided in any one of other ICs (for example, the IC 20A). In such a case, a plurality of voltage limiters might be connected electrically in parallel. Therefore, when a voltage limiter having the lowest limited voltage Vlim is in a voltage limiting operation, the other voltage limiter does not perform the voltage limiting operation any longer. Accordingly, the other voltage limiter might be functioning as a back-up voltage limiter. That is, even if one voltage limiter breaks down and the voltage limiting operation cannot be carried out any longer, the other voltage limiter performs the back-up operation. Thus, the voltage limiting operation can be reliably carried out. This technical aspect can be also applied to the following second embodiment.

Figure 4:
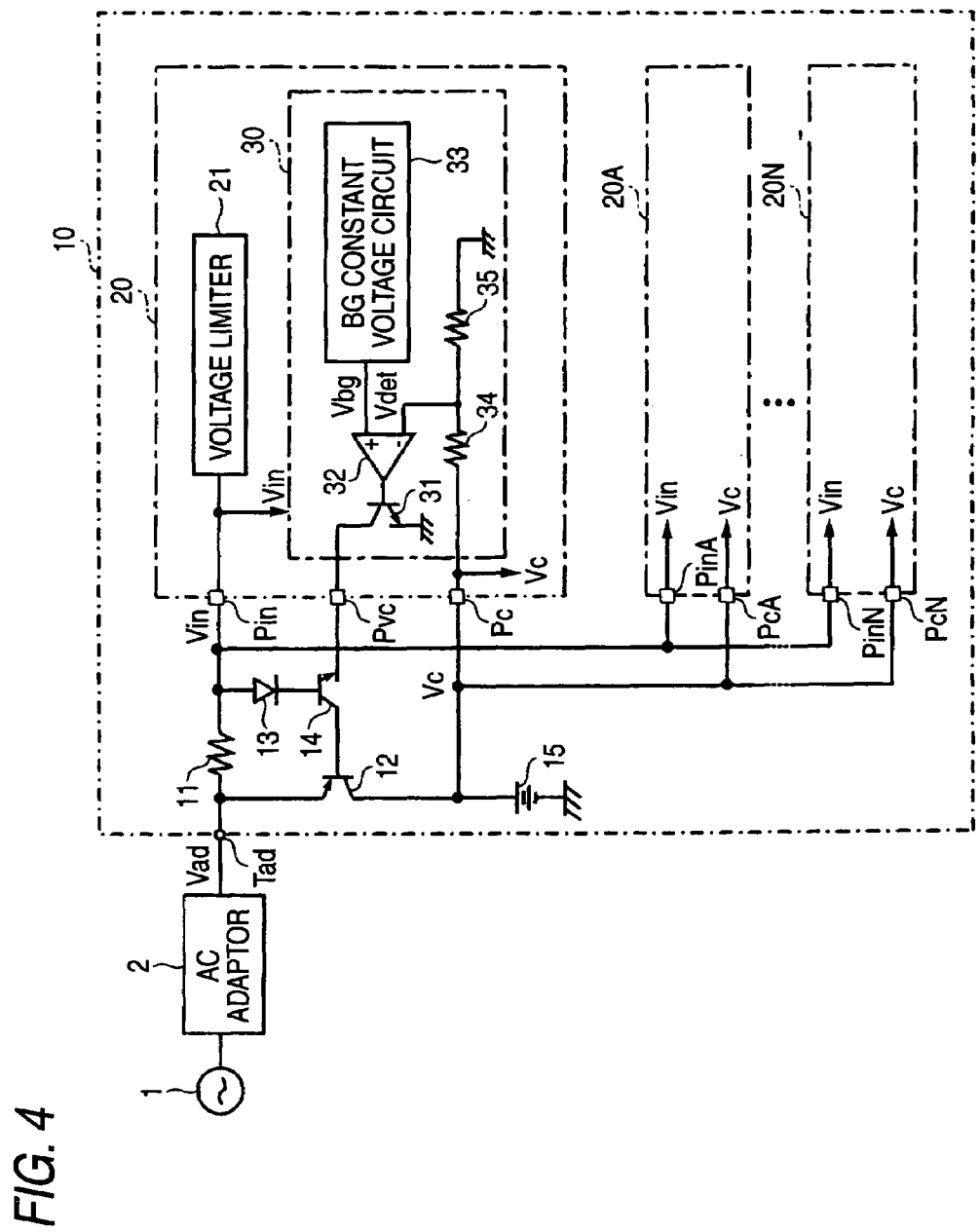
FIG. 4 is a diagram showing a circuit structure according to a second embodiment of the invention.
Figure 5:
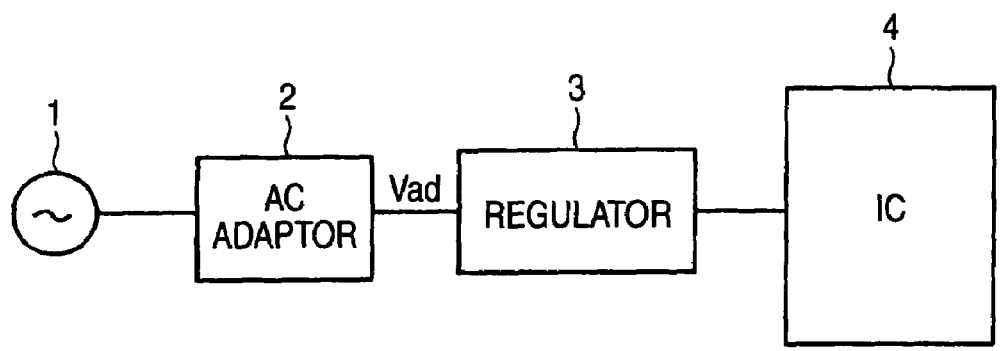
FIG. 5 is a diagram showing a structure in which a power is supplied from an AC adaptor to an IC chip according to a conventional example.

FIG. 4 is a diagram showing the circuit structure of an electronic apparatus according to the second embodiment of the present invention. In addition to the electronic apparatus according to the first embodiment as shown in FIG. 1, a controlled constant voltage can be utilized in each of the ICs 20 and 20A to 20N. Components having the same structures as those of the electronic apparatus in FIG. 1 are put the same reference numerals, therefore the repetitive description will be omitted.

In FIG. 4, a constant voltage Vc is obtained from an external power terminal Tad through a control transistor 12, so called a PNP transistor (hereinafter referred to as a PNP) and said Vc is input to a constant voltage input terminal Pc of the IC 20. The base of the control transistor 12 is connected to a voltage control terminal Pvc of the IC 20 through an NPN 14, and furthermore, a diode 13 has a cathode connected to the base of the NPN 14 while the anode connected to a voltage input terminal Pin.

A control block 30 is provided as one of the circuit blocks in the IC 20. The control block 30 is provided with an error amplifier 32, and a detection voltage Vdet, which is obtained by dividing the constant voltage Vc, being input to the constant voltage input terminal Pc, through the voltage dividing resistors 34 and 35, is compared with a constant reference voltage Vbg formed in a band gap (BG) constant voltage circuit 33. Furthermore, an NPN driving transistor 31 is provided between the voltage control terminal Pvc and a ground. The control output of the error amplifier 32 is supplied to the base of the driving transistor 31.

Moreover, the IC 20 has such a structure that an input voltage Vin is supplied to another predetermined circuit block and the constant voltage Vc is supplied to the predetermined circuit block.

In the electronic apparatus 10, furthermore, a battery 15 is connected to a portion of the constant voltage Vc point and is constituted to perform a floating charge. Moreover, the input voltage Vin and the constant voltage Vc are supplied to voltage input terminals PinA to PinN and constant voltage input terminals PcA to PcN, those which are provided in ICs 20A to 20N. In the ICs 20A to 20N, the input voltage Vin and the constant voltage Vc are supplied to a predetermined circuit block (not shown). A capacitor may be used in place of the battery 15 or the battery 15 is not necessarily provided.

In the second embodiment of FIG. 4, the limited input voltage Vin is supplied to the control block 30 to carry out a predetermined control operation.

In the control block 30, the driving transistor 31 is controlled in response to a control signal based on a comparison between the reference voltage Vbg supplied to a (+) input terminal of the error amplifier 32 and the detection voltage Vdet input to a (−) input terminal thereof.

The degree of conduction of the control transistor 12 is controlled through the auxiliary transistor 14 in accordance with the control of the driving transistor 31 so that the constant voltage Vc is output.

For the voltage of the voltage control terminal Pvc, moreover, a voltage of (Vin−Vf−Vbe) obtained by subtracting the voltage Vf corresponding to the forward voltage drop of the diode 13 and a voltage Vbe corresponding to a voltage drop between the base and the emitter of the auxiliary transistor 14 from the input voltage Vin is applied.

Accordingly, the limited input voltage Vin is input to the voltage input terminal Pin and a lower voltage than the input voltage Vin by a predetermined amount is input to the voltage control terminal Pvc, and furthermore, the constant voltage Vc is input to the constant voltage input terminal Pc. Therefore, only a voltage which is equal to or lower than a limited voltage is input to the IC 20.

Moreover, the limited input voltage Vin and the constant voltage Vc are input to the ICs 20A to 20N. Therefore, it is not necessary to take a protection against an overvoltage into consideration. In the case in which the input voltage Vin is not used in the ICs 20A to 20N, the voltage input terminals PinA to PinN can be reduced.

In the second embodiment, the same advantages as those in the first embodiment can be produced, and furthermore, the constant voltage Vc is supplied to the predetermined circuit blocks in the ICs 20 and 20A to 20N without being influenced by a fluctuation in the DC power voltage Vad applied from an AC adaptor 2 and a noise. Moreover, the control transistor 12 is connected to the external power terminal Tad side. Consequently, a circuit block current for supplying the constant voltage Vc and a charging current to be supplied to the battery 15, which is charged at the constant voltage Vc, can be prevented from flowing into a resistor 11 constituting an overvoltage limiting circuit. Accordingly, a corresponding voltage drop or heat loss is not caused by the resistor 11 but the constant voltage Vc having a sufficient magnitude can be maintained and an extra loss can be reduced.

In the case in which a plurality of ICs 20 and 20A to 20N is used, furthermore, the ICs 20A to 20N other than a first IC 20 comprising a control block are protected from an overvoltage without taking any countermeasure for an overvoltage protection and the predetermined constant voltage Vc can be utilized.

Furthermore, Pvc is applied to be lower than the input voltage Vin to the voltage control terminal. Consequently, the influence of the overvoltage can be avoided.

Moreover, the electronic apparatus according to the invention can have such a structure as to comprise a first IC including a first voltage input terminal, a voltage limiting means, which is connected electrically to the first voltage input terminal and serving to limit a voltage to be applied to the first voltage input terminal so as to have a predetermined value, and a control block to which the voltage limited by a voltage control terminal, the first constant voltage input terminal and the voltage limiting means is supplied and which compares a detection voltage based on a constant voltage to be applied to the first constant voltage input terminal with a reference voltage, thereby applying a control signal based on a result of the comparison to the voltage control terminal, an external power terminal to which a DC power voltage is applied from an outside, a resistor connected electrically between the external power terminal and the first voltage input terminal, and a control transistor connected electrically between the external power terminal and the first constant voltage input terminal and controlled by the control signal applied to the voltage control terminal, wherein the resistor and the voltage limiting means limit an input voltage to be applied to the first voltage input terminal to have the predetermined value when the DC power voltage to be applied to the external power terminal becomes an overvoltage, and the constant voltage is supplied to a predetermined circuit block in the first IC.

Furthermore, the electronic apparatus according to the invention can further comprise at least one second IC including a second constant voltage input terminal to which the constant voltage is applied, and a predetermined circuit block to which the constant voltage applied to the second constant voltage input terminal is supplied.

In addition, the electronic apparatus according to the invention can have such a structure that an auxiliary transistor is provided between the control input section of the control transistor and the voltage control terminal, and the input voltage is supplied through a diode to the control input section of the auxiliary transistor.

According to the electronic apparatus in accordance with the first aspect of the invention, an unexpected abnormal voltage generated in the DC power supply such as the AC adaptor is limited by the voltage limiting means provided in the IC and the voltage input terminal of the IC and the external terminal. Therefore, a voltage having a predetermined value or more can be prevented from being applied to the IC. Accordingly, a regulator having a high breakdown voltage is not required so that a cost can be reduced.

Furthermore, the resistor constituting the overvoltage limiting circuit is provided on the outside of the IC. Therefore, it is possible to easily satisfy a requirement for controlling a current flowing to an overvoltage limiting unit in an overvoltage limitation to have a value within a predetermined range and for controlling heat generated in the resistor to be within a predetermined range. Consequently, the overvoltage resistance amount of the IC can be reduced and a process design including an overvoltage limiting means can easily be carried out.

According to the electronic apparatus in accordance with the second aspect of the invention, in the case in which a plurality of ICs is used, the ICs other than the IC provided with the voltage limiting means can be protected from an overvoltage without taking any countermeasure for an overvoltage protection.

What is claimed is:

1. An electronic apparatus comprising:
   a first IC including a first voltage input terminal, voltage limiting means for serving to limit an input voltage to be applied to the first voltage input terminal to have a predetermined value, said voltage limiting means being connected electrically to the first voltage input terminal, a voltage control terminal, a first constant voltage input terminal, and a control block to which the input voltage limited by the voltage limiting means is supplied, where a detection voltage, which is based on a constant voltage applied to the first constant voltage input terminal, is compared with a reference voltage so as to apply a control signal to the voltage control terminal based on a result of said comparison;
   an external power terminal to which a DC power voltage is applied from an outside;
   a resistor which is electrically connected between the external power terminal and the first voltage input terminal;
   a control transistor, being electrically connected between the external power terminal and the first constant voltage input terminal, which is controlled by the control signal, and
   a second IC including a second voltage input terminal to which the input voltage applied to the first voltage input terminal is applied, a second constant voltage input terminal to which the constant voltage is applied, a second circuit block, being electrically connected to the second voltage input terminal, where the input voltage is supplied, and a predetermined circuit block, being electrically connected to the second constant voltage input terminal, where the constant voltage applied thereto is supplied, wherein
   said resistor and said voltage limiting means limit an input voltage to be applied to the first voltage input terminal and the second voltage input terminal such as to have the predetermined value when the DC power voltage to be applied to the external power terminal becomes an overvoltage, and the constant voltage is supplied to a predetermined circuit block which is provided in the second IC.

* * * * *